Aug. 24, 1937.   C. B. CLARK   2,090,936
PROCESS FOR CONCENTRATING IMPURE WEAK SULPHURIC ACID
Original Filed March 18, 1930
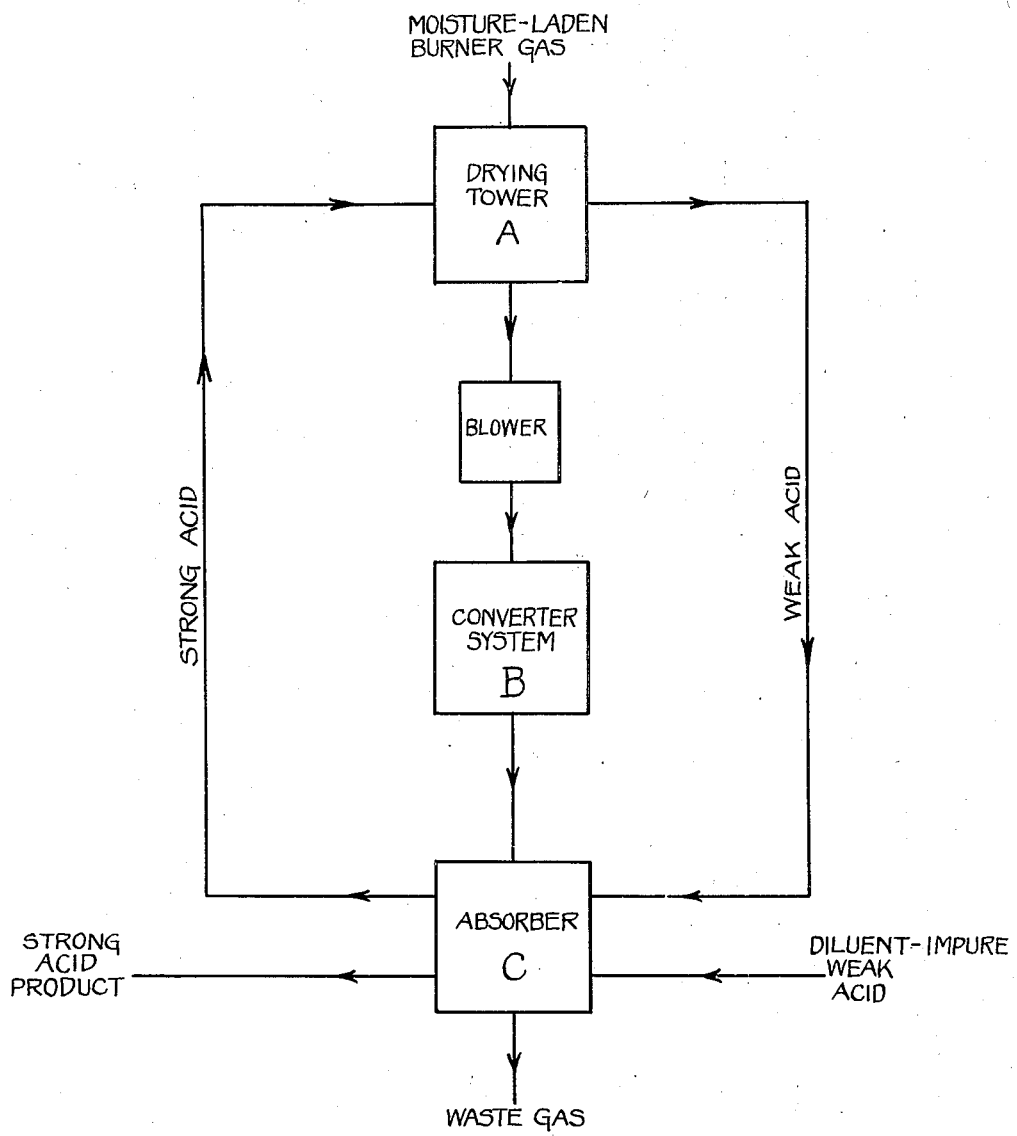
Inventor
CYRIL B. CLARK
By his Attorney Patented Aug. 24, 1937

2,090,936

UNITED STATES PATENT OFFICE 2,090,936

PROCESS FOR CONCENTRATING IMPURE WEAK SULPHURIC ACID

Cyril B. Clark, Scarsdale, N. Y., assignor, by mesne assignments, to American Cyanamid & Chemical Corporation, a corporation of Delaware Application March 18, 1930, Serial No. 436,656
Renewed June 17, 1936

9 Claims. (Cl. 23—169)

My invention relates to a process for the concentration of weak sulphuric acid, and more specifically to an improved process in which a weak acid containing impurities, such as fluorine, chlorine or arsenic, is readily and economically concentrated in a contact sulphuric acid plant.

It has been customary to concentrate weak sulphuric acid in a contact sulphuric acid plant by adding the weak acid to the absorber, where by combination with $SO_3$ in the gas from the converters, the acid is concentrated to any strength desired. Heretofore this process has been necessarily limited to the concentration of relatively pure acid such, for example, the chamber acid made from brimstone of the Louisiana brimstone type.

The reason why weak sulphuric acid containing appreciable amounts of such impurities as chlorine, fluorine, arsenic, etc., could not be economically concentrated lies in the difficulty of using this impure acid to the best advantage in a contact sulphuric acid plant. A considerable portion of the moisture required for making sulphuric acid in the contact process comes from the moisture in the burner gas, and it has been heretofore necessary to remove this moisture before the gas passes to the converter system.

The usual practice is to use the strong acid made in the absorbing towers for drying the moisture-laden burner gas. When this method is used with impure acid, the various impurities introduced into the absorbing tower are transferred to the drying tower, and then to the gas in sufficient amounts to interfere seriously with the activity of the catalyst in the converters. It has therefore been practically impossible heretofore to concentrate impure acid in such a system, for example, acid produced from Spanish ore in the purification system, or acid produced from such ore in chamber sulphuric acid plants.

In my improved process I use as contact materials any one of the various vanadium catalysts on the market, such as the so-called Selden catalysts, such as are described in U. S. Jaeger Patents Nos. 1,675,308 and 1,675,309 of June 28, 1928 and No. 1,694,123 of December 4, 1928. These catalysts are generally silicates containing two or more bases and with such catalysts the presence of fluorine and other impurities which may destroy or seriously poison the catalyst is important. In my process I eliminate such impurities to an extent that they are not injurious to the catalyst.

According to my process I prefer to operate with the absorbing acid around 200° F. and at a strength of 99% $H_2SO_4$, and with the drying acid around 150° F. and at a strength of 78% $H_2SO_4$. Under these operating conditions fluorine, chlorine, arsenic and such impurities are less soluble in the absorbing acid than in the drying acid, and it is therefore possible to operate so that the drying acid will act as an absorbent for such impurities contained, for example, in the moisture-laden burner gas, and the absorbing acid will act so as to release these impurities to pass out of the system in the waste gas.

By my improved concentration process, impurities in the drying acid and from the burner gas are prevented from entering or combining with the gases going to the converters, since they are transferred directly to the absorbing tower, and are removed from the absorbing acid in the waste gases leaving the system.

I thus accomplish two objects, viz: first I remove impurities from the burner gas and transfer them around the catalyst; and second I eliminate impurities in the weak acid used for diluting the absorbing acid since these impurities are eliminated in the waste gas while the weak acid is concentrated to any strength desired. Such impurities are eliminated because they are less soluble in the strong acid at the higher temperatures obtaining in the absorber and will be carried along by the waste gases sweeping through the absorber. A part of the strong acid is returned to the drying tower to act on the burner gases entering the system.

In explaining my invention more specifically, I will make reference to the accompanying flowsheet drawing showing diagrammatically as much of a contact sulphuric acid plant as is necessary to illustrate my improved process for concentrating impure weak sulphuric acid.

In practice I add weak impure acid, such as chamber acid made from Spanish ore, as a diluent to the absorbing tower C where the gaseous impurities such as fluorine, chlorine, etc., are, to a large extent, eliminated due to the temperature and strength of the resulting strong acid. Part of the absorbing acid is passed back to the drying tower A where it is diluted to about 60° Bé. and is used for removing moisture and gaseous impurities from the burner gas conducted into the tower A. Such weak acid is then returned to the absorbing tower C for the elimination of accumulated impurities, while the purified $SO_2$ gas mixture in the tower A is passed by a blower into the converter system B and the $SO_3$ gas is then passed into the absorber C from which the strong acid product may be withdrawn.

I have found that when operating as above described, I can use impure weak acid in the absorbing tower C for dilution, and by-pass the impurities in the burner gas to a sufficient extent that no deterioration or poisoning of the catalyst takes place. Furthermore I can obtain the normal 97–98% conversion ordinarily obtained when pure acid is used as a diluent and/or where the gaseous impurities are completely removed in the purification system prior to passing into the drying power A before conversion.

I claim as my invention:

1. In a contact sulphuric acid process, the steps which comprise removing water and volatile impurities from hot burner gases containing them and $SO_2$, by contacting said gases with sulphuric acid of a strength and at a temperature as will transfer such impurities from the gas to the acid, passing the thus purified sulphur dioxide containing gases to a contact converter system, removing the volatile impurities from the impure weak acid from the gas purification step and simultaneously absorbing the sulphur trioxide content of such gas, by contacting said acid at a temperature and of a strength as will permit the elimination of these impurities, with the hot converter gases, whereby the acid is concentrated and volatile impurities transferred to the waste gas and removed from the system, and using the thus concentrated acid to purify fresh, hot impure burner gases.

2. The process of claim 1 in which the concentrated sulphur trioxide absorbing acid is diluted with weaker impure sulphuric acid.

3. The process of claim 1 in which the strength of the acid in the gas purification step is substantially 78%.

4. The process of claim 1 in which the temperature of the acid in the gas purification step is substantially 150° F.

5. The process of claim 1 in which the strength of the acid in the gas purification step is substantially 78% and its temperature substantially 150° F.

6. The process of claim 1 in which the strength of the sulphur trioxide absorbing acid is substantially 99%.

7. The process of claim 1 in which the temperature of the sulphur trioxide absorbing acid is substantially 200° F.

8. The process of claim 1 in which the strength of the sulphur trioxide absorbing acid is substantially 99% and its temperature substantially 200° F.

9. The process of claim 1 in which the strength of the acid in the gas purification step is substantially 78% and its temperature substantially 150° F., and the strength of the sulphur trioxide absorbing acid is substantially 99% and its temperature substantially 200° F.

CYRIL B. CLARK.